(12) United States Patent
Kourogi et al.

(10) Patent No.: US 8,878,935 B2
(45) Date of Patent: Nov. 4, 2014

(54) IN-VEHICLE CAMERA AND IN-VEHICLE CAMERA SYSTEM

(75) Inventors: Naoki Kourogi, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/983,289

(22) PCT Filed: Mar. 1, 2012

(86) PCT No.: PCT/JP2012/055251
§ 371 (c)(1),
(2), (4) Date: Aug. 1, 2013

(87) PCT Pub. No.: WO2012/121107
PCT Pub. Date: Sep. 13, 2012

(65) Prior Publication Data
US 2013/0335561 A1     Dec. 19, 2013

(30) Foreign Application Priority Data
Mar. 4, 2011 (JP) .................. 2011-047070

(51) Int. Cl.
*H04N 7/18* (2006.01)
*G06K 9/00* (2006.01)
*H04N 5/225* (2006.01)
*G08G 1/16* (2006.01)
*B60R 21/0134* (2006.01)

(52) U.S. Cl.
CPC .................. *H04N 7/18* (2013.01); *G08G 1/165* (2013.01); *B60R 21/0134* (2013.01)
USPC ......... 348/148; 348/218.1; 382/103; 382/104

(58) Field of Classification Search
CPC ....... B60R 21/0134; H04N 7/18; G08G 1/165
USPC ....................................................... 348/138
See application file for complete search history.

(56) References Cited

U.S. PATENT DOCUMENTS

2004/0252864 A1* 12/2004 Chang et al. .................. 382/104
2009/0079839 A1* 3/2009 Fischer et al. ............. 348/218.1
(Continued)

FOREIGN PATENT DOCUMENTS

| JP | 2003-2138 A | 1/2003 |
|---|---|---|
| JP | 2007-213353 A | 8/2007 |

(Continued)

OTHER PUBLICATIONS

Corresponding International Search Report with English Translation dated May 29, 2012 (three (3) pages).

*Primary Examiner* — Hee-Yong Kim
(74) *Attorney, Agent, or Firm* — Crowell & Moring LLP

(57) ABSTRACT

In the present invention, images at a front side or a rear side of a vehicle are obtained from a plurality of image capturing devices and a disparity and a distance to the captured object are calculated from the images, if the disparity is not sufficiently obtained, pattern light is irradiated onto a capturing object and an image of the object onto which the pattern light is irradiated is obtained again from the plurality of image capturing devices and the disparity and the distance to the captured object are calculated. Therefore, it is possible to provide an in-vehicle camera and system that recognizes an obstacle even in a situation where it is difficult to obtain the disparity of the obstacle around the vehicle.

5 Claims, 4 Drawing Sheets

(56) References Cited

U.S. PATENT DOCUMENTS

2009/0226035 A1 9/2009 Iihoshi et al.
2011/0019873 A1 1/2011 Yamato

FOREIGN PATENT DOCUMENTS

| | | |
|---|---|---|
| JP | 2010-170449 A | 8/2010 |
| WO | WO 2009/099022 A1 | 8/2009 |

* cited by examiner

IN-VEHICLE CAMERA AND IN-VEHICLE CAMERA SYSTEM

TECHNICAL FIELD

The present invention relates to an in-vehicle camera and an in-vehicle camera system that capture a circumference of a vehicle using a stereo camera to avoid collision with an obstacle or reduce damage based on a captured image.

BACKGROUND ART

In recent years, a device that detects an obstacle such as a pedestrian, a vehicle, or a guardrail using a stereo camera and issues an alert or performs break assist is practically used.

However, when a disparity by the stereo camera is calculated, it is probably difficult to obtain the disparity from a plane which does not a pattern or a wall on which the identical stripes are uniformly drawn, and in this case, it is difficult to prevent the collision with the obstacle.

In order to solve the above-mentioned problem, for example, as disclosed in PTL 1, a method that, when a clutch mechanism is operated at a rear side, pattern light is irradiated at a rear side of the vehicle to obtain the disparity from a wall of a garage which does not have a pattern is disclosed.

CITATION LIST

Patent Literature

PTL 1: Publication of Japanese Patent Application Laid-Open No. 2003-2138

SUMMARY OF INVENTION

Technical Problem

However, in the aforementioned related art, the pattern light is consistently irradiated in tandem with the rear operation of the clutch mechanism, which may dazzle the circumference. Even in a case where the pattern light is invisible light, the pattern light may affect the same camera system and the power consumption thereof is increased.

Further, uniform pattern light is consistently irradiated so that the disparity may not be calculated depending on a shape of an object. In addition, if a brightness of an object to be captured is high, an image which is captured by the image capturing unit is saturated so that it may be difficult to calculate the disparity.

As described above, an object of the present invention is to provide an in-vehicle camera and an in-vehicle camera system that precisely detect an obstacle and avoid the collision and reduce the damage even when the image is captured in a situation where the disparity is hard to be calculated using a stereo camera such as a plane which does not have a pattern or a wall on which identical stripes are uniformly drawn.

Solution to Problem

In view of the above problems, an in-vehicle camera according to the present invention includes: a plurality of image capturing devices that captures an image outside a vehicle; a disparity calculating unit that calculates disparity information from a plurality of images captured by the plurality of image capturing devices; a distance calculating unit that calculates distance information to an object that is present outside the vehicle based on the disparity information calculated in the disparity calculating unit; an irradiating timing determining unit that determines whether the disparity information is calculated in the disparity calculating unit within a predetermined set time and determines whether to irradiate invisible pattern light or visible pattern light to the outside of the vehicle based on the result of determination; and a collision determining unit that determines a probability of collision based on the distance information calculated in the distance calculating unit, wherein even when the disparity information is not calculated in the disparity calculating unit within the predetermined set time, if the plurality of image capturing devices captures an image of the irradiating region after the irradiating timing determining unit outputs a signal to irradiate the pattern light and the disparity calculating unit calculates the disparity information from the captured image data, the distance calculating unit calculates distance information from the disparity information.

This specification includes contents disclosed in a specification and/or drawings of Japanese Patent Application No. 2011-047070 which is a base of a priority right of this application.

Advantages Effects of Invention

It is possible to provide an in-vehicle camera and an in-vehicle camera system that precisely detect an obstacle and avoid the collision and reduce the damage even when the image is captured in a situation where the disparity is hard to be calculated using a stereo camera such as a plain which does not have a pattern or a wall on which identical stripes are uniformly drawn.

DESCRIPTION OF EMBODIMENTS

Figure 1:
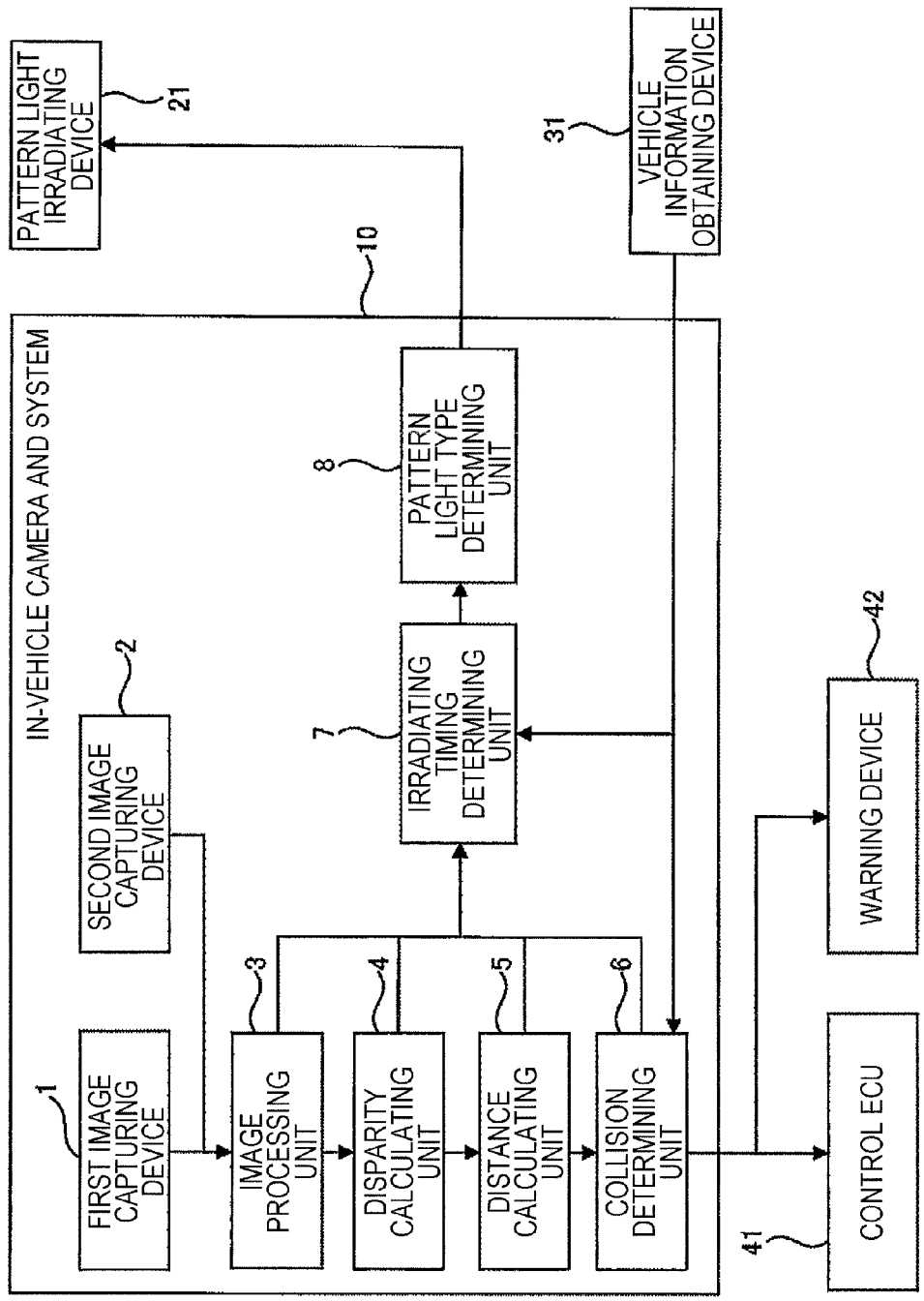
FIG. 1 is a view illustrating functional blocks of an embodiment of an in-vehicle camera and an in-vehicle camera system according to the present invention.

Hereinafter, an embodiment of the present invention will be described with reference to the drawings. FIG. 1 illustrates an example of an in-vehicle camera 10 and an in-vehicle camera system which includes the in-vehicle camera 10, according to the present invention.

According to the embodiment, the in-vehicle camera 10 is a stereo camera and as illustrated in the drawing, includes an image processing unit 3 which performs image processing on image data obtained by a first image capturing device 1 and a second image capturing device 2, a disparity calculating unit 4 which calculates a disparity from two image data obtained by the first image capturing device 1 and the second image capturing device 2, a distance calculating unit 5 which calculates a distance to an object based on a calculated disparity, a collision determining unit 6 which determines a probability of the collision based on a calculated distance, an irradiating timing determining unit 7 which determines a timing to irradiate pattern light based on the disparity calculated by the disparity calculating unit 4 and vehicle information obtained from a vehicle information obtaining device 31, and a pattern light type determining unit 8 that determines most effective pattern light in order to calculate the disparity.

The in-vehicle camera 10 is connected to a pattern light irradiating device 21 which is a light source to irradiate the pattern light, and the in-vehicle camera 10 outputs the irradiating timing (irradiation information) determined by the irradiating timing determining unit 7 in the in-vehicle camera 10 and the type of pattern light determined by the pattern light type determining unit 8 to the pattern light irradiating device 21. The irradiating timing and the type of pattern light may be output to the pattern light irradiating device 21 as one pattern light information so as to associate the irradiating timing with the type of pattern light or output as individual information.

The in-vehicle camera 10 is connected to the vehicle information obtaining device 31 and may obtain the vehicle information such as a vehicle speed, a yaw rate, or a rudder angle.

Further, the in-vehicle camera 10 is further connected to a control ECU 41 which is a control device that controls the vehicle based on the determination result in the collision determining unit 6 and a warning device 42 which issues an alert based on the determination result in the collision determining unit 6. For example, when the probability of collision is high as the determination result of the collision determining unit 6, the control ECU 41 controls the vehicle to put on the brake, release a gas pedal, or suppress an engine power to avoid collision and reduce damage. The warning device 42 issues an alert such as a sound, displays alert information on a screen of a car navigation system, or applies a vibration to a seat belt or a steering to give a warning to a user.

In the present invention, the circumference of the vehicle, for example, a front side or a rear side is captured by the in-vehicle camera 10. Here, an embodiment of an in-vehicle camera system when the present invention is applied to the front side of the vehicle is illustrated in FIG. 2.

A capturing range 51 which is a range captured by the in-vehicle camera 10 and an irradiating range 52 which is a range irradiated by the pattern light irradiating device 21 need to face the same direction.

Figure 2:
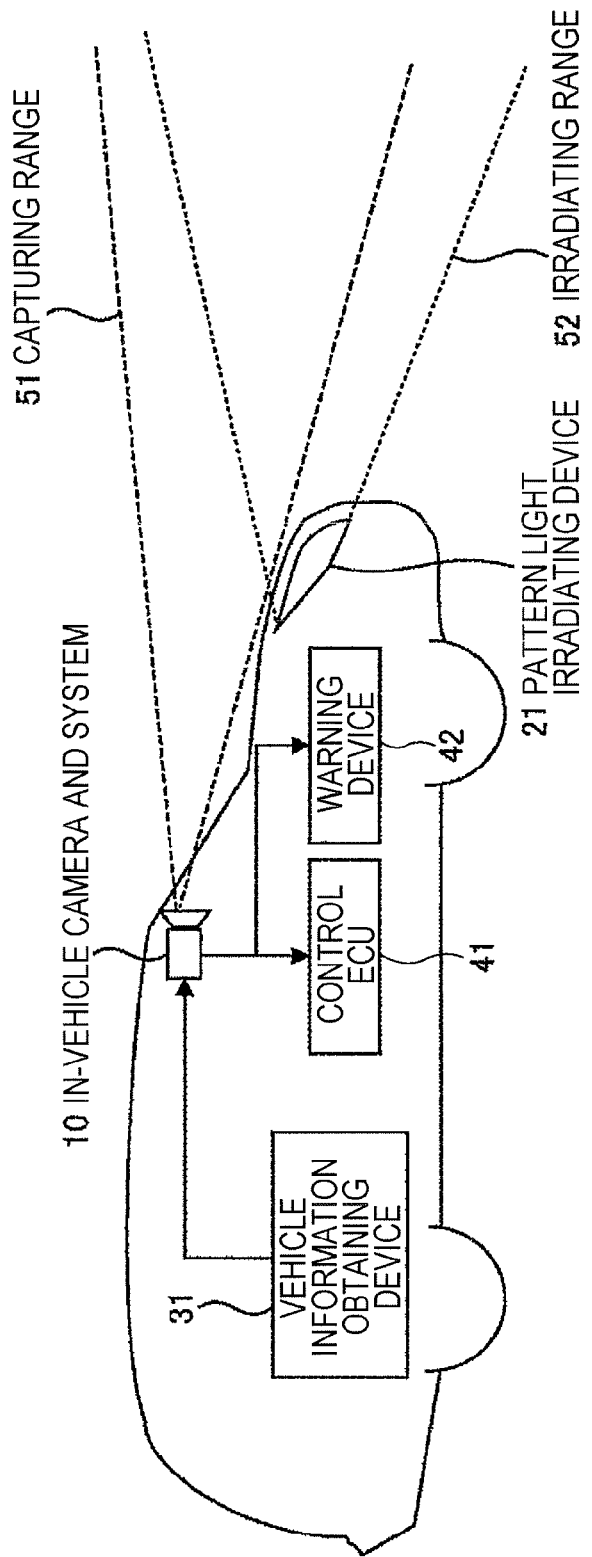
FIG. 2 is a view illustrating an embodiment when the in-vehicle camera and the in-vehicle camera system according to the present invention are mounted in a vehicle.

In the example illustrated in FIG. 2, a spotlight of the vehicle is used as the pattern light irradiating device 21, but a fog lamp or other light source may be used. Further, in the rear side, a taillight or a rear fog lamp of the vehicle may be used.

Figure 3:
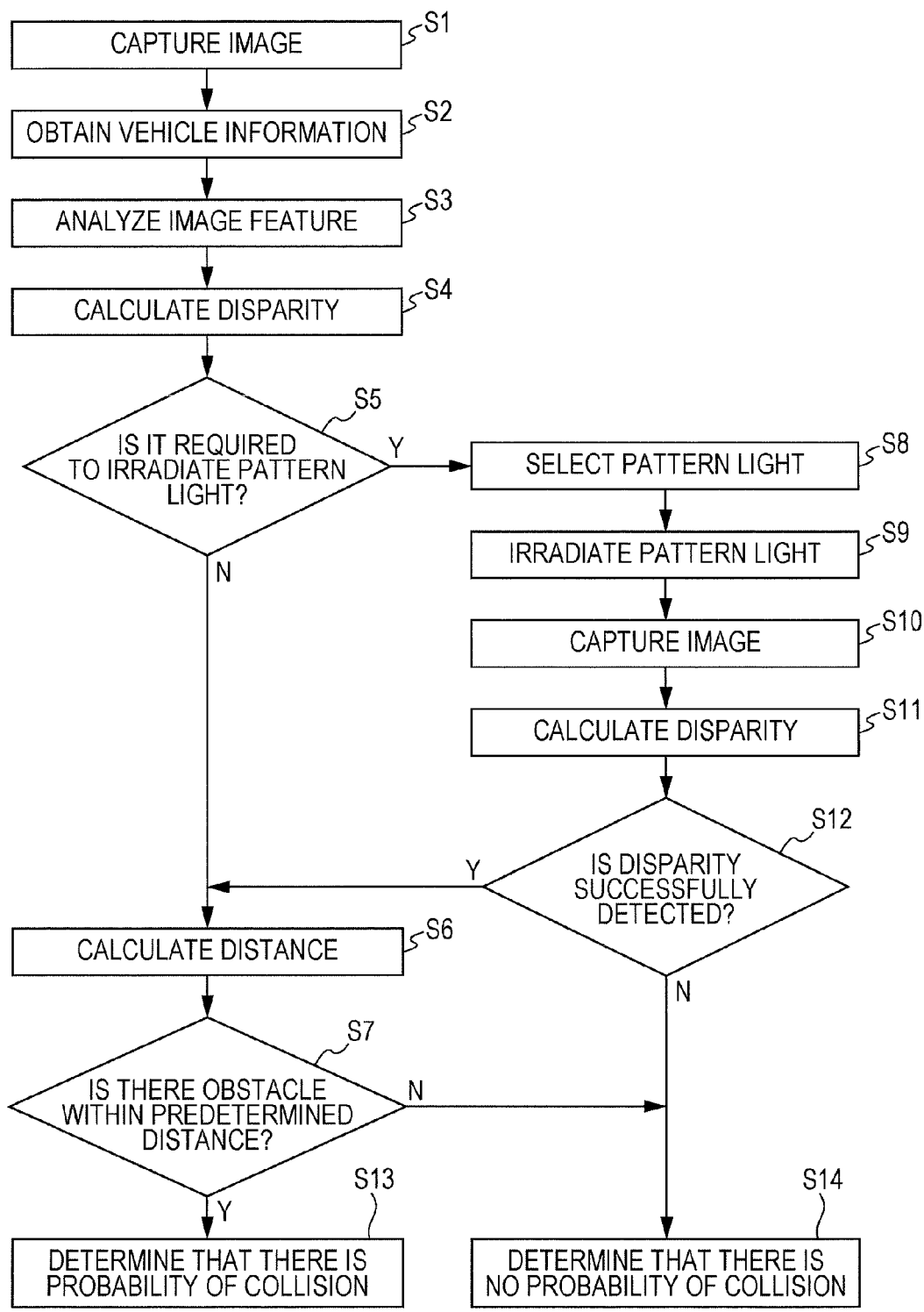
FIG. 3 is a flow chart illustrating an operational example of the in-vehicle camera and the in-vehicle camera system according to the present invention.

FIG. 3 is a flow chart illustrating an operational example of the in-vehicle camera 10 in the embodiment. Hereinafter, the operation of the in-vehicle camera 10 will be described according to the flow chart.

First, in step S1, image data is obtained using the first image capturing device 1 and the second image capturing device 2. The first image capturing device 1 and the second image capturing device 2 may be synchronized with each other or a difference in image capturing times may be set in advance.

Next, in step S2, the vehicle information is obtained from the vehicle information obtaining device 31. The vehicle information is information including a vehicle speed, a yaw rate, and a rudder angle.

Next, in step S3, an image feature of the obtained image data is analyzed. The image feature refers to a feature amount such as an amount or a direction of edge or a concentration value. The image processing unit 3 analyzes the image feature. Here, the image feature analysis may be performed on image data captured by both the first image capturing device 1 and the second image capturing device 2 or on image data captured by any one of the first image capturing device 1 and the second image capturing device 2.

In step S4, a disparity between the image data captured in the first image capturing device 1 and the second image capturing device 2 is calculated by the disparity calculating unit 4. Further, as the disparity calculating method, a known technique such as an SSDA method or an area correlation method may be used and thus, the detailed description thereof will be omitted in this embodiment.

Further, steps S2, S3, and S4 may be performed in the above order or in parallel.

Continuously, in step S5, the irradiating timing determining unit 7 determines a timing to irradiate the pattern light, that is, whether to irradiate the pattern light.

In some cases, the stereo camera may not detect a corresponding point from a wall which does not have a contrasting density as illustrated in FIG. 4A or a surface on which identical stripes are continuously drawn as illustrated in FIG. 4B and may not calculate the disparity. In this case, it is known that the pattern light is irradiated to effectively calculate the disparity. However, when the pattern light is consistently irradiated onto the object to be captured, there are problems in that the circumference may be dazzled and the power consumption is increased. Therefore, a timing when the irradiation is required is determined and the light is irradiated only at the timing so that the above problems may be lessened.

Specifically, the pattern light is irradiated when the disparity calculating unit 4 cannot calculate the disparity information for a predetermined time or longer. An irradiating time is one exposure cycle of the first image capturing device 1 and the second image capturing device 2 as the shortest time. In a general image capturing device, one thirtieth of a second or shorter is suitable for the irradiating time, and thus the above-mentioned problem may be significantly lessened.

Further, the pattern light may be irradiated, when a situation at the front side or the rear side is unclear, for example, immediately after starting the engine. Accordingly, it is possible to more precisely perform a function that prevents an accident caused by putting a gearshift lever in a wrong position at the time of accelerating or erroneously pressing a brake pedal or a gas pedal.

Therefore, when the disparity calculating unit 4 may calculate the disparity information for a predetermined time or shorter, the pattern light is not irradiated and the distance calculating unit 5 calculates a distance to the object which is present in the image captured in step S6. The distance may be calculated from the disparity calculated by the disparity calculating unit 4, and internal parameters and external parameters of the first image capturing device 1 and the second image capturing device 2.

Thereafter, it is determined whether the distance calculated in step S7 is within a predetermined set distance, that is, whether an obstacle is present within a set distance to determine a probability of collision at the front side or the rear side. If there is an obstacle within the set distance, it is determined that there is a probability of collision (step S13), and if there is no obstacle within the set distance, it is determined that there is no probability of collision (step S14).

Next, the determination result of the collision information in step S7 is notified to the control ECU 41 or the warning device 42. If it is determined that there is a probability of collision, the control ECU 41 generates and outputs a control signal to put on the brake, that is, generate a braking force to each wheel or suppresses the output of the engine so as to avoid or reduce the severity of an accident. Further, the warning device 42 may notify danger to the user using a sound, an image, or a vibration.

Figure 4:
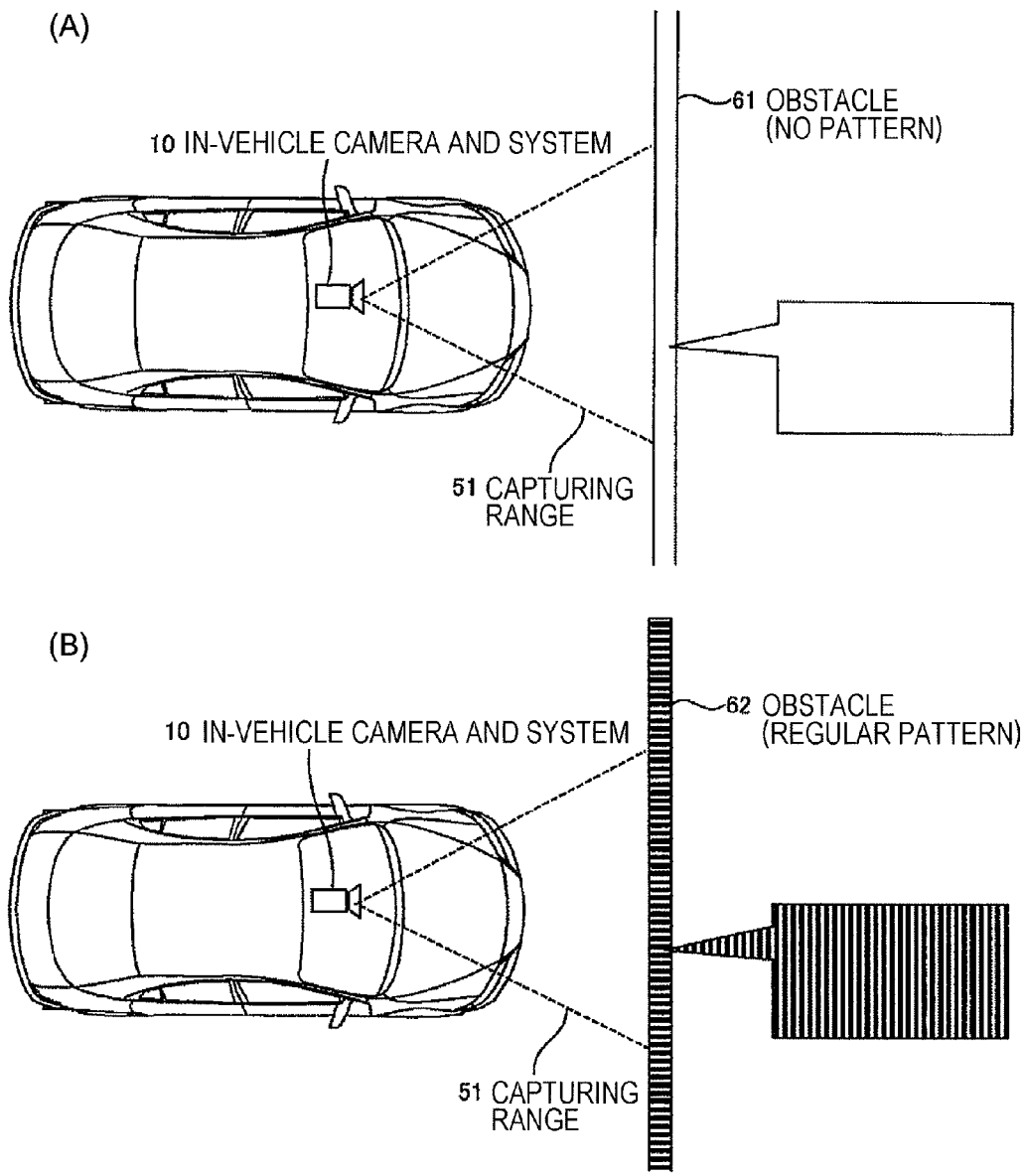
FIG. 4 is a view illustrating a case where a disparity is hard to be calculated when pattern light is not irradiated.

If it is determined that the pattern light needs to be irradiated in step S5, the pattern light is selected in step S8. As illustrated in FIG. 4, in some cases, the stereo camera cannot calculate the disparity and in each case, it is known which pattern light is effective, and thus a type of the pattern light to be irradiated may be determined based on the image feature analyzed in step S3.

Continuously, in step S9, at the timing determined in step S5, irradiation information to irradiate the pattern light in a direction (at the front side of the vehicle in this embodiment) captured by the first image capturing device 1 and the second image capturing device 2 using the pattern light selected in step S8 is output.

Next, in step S10, an image is captured again by the first image capturing device 1 and the second image capturing device 2. Here, at the capturing timing, the exposure is performed while the pattern light is irradiated.

In step S11, a disparity for the image captured in step S10 is calculated. The disparity is calculated by the disparity calculating unit 4. When the pattern light is irradiated, the disparity is calculated to easily detect the corresponding point by a stereoscopic vision and thus the disparity may be more desirably calculated as compared when the pattern light is not irradiated.

In step S12, it is determined whether the disparity is successfully calculated in step S11 or the disparity can be calculated. If the disparity is successfully calculated as a result of determination, it is considered that an obstacle is present in front of the vehicle and in step S6, a distance to the obstacle is calculated based on the image data captured in step S10. As a result of the determination, if the disparity calculation fails, that is, the disparity is not calculated, it is considered that no obstacle is present in front of the vehicle and it is determined that there is no probability of collision (step S14).

The above processings are repeated to effectively detect the obstacle while minimizing the problem caused by irradiating the pattern light. In other words, even when the image is captured by the stereo camera in a situation where it is difficult to calculate the disparity, it is possible to precisely detect the obstacle, avoid the collision, and reduce the damage.

REFERENCE SIGNS LIST 1 first image capturing device
2 second image capturing device
3 image processing unit
4 disparity calculating unit
5 distance calculating unit
6 collision determining unit
7 irradiating timing determining unit
8 pattern light type determining unit
10 in-vehicle camera
21 pattern light irradiating device
31 vehicle information obtaining device
41 control ECU
42 warning device
51 capturing range
52 irradiating range All publications, patents, and patent applications which are cited in this specification are incorporated herein by reference.

The invention claimed is:

1. An in-vehicle camera, comprising:
a plurality of image capturing devices that captures an image outside a vehicle;
a disparity calculating unit that calculates disparity information from a plurality of images captured by the plurality of image capturing devices;
a distance calculating unit that calculates distance information to an object that is present outside the vehicle based on the disparity information calculated in the disparity calculating unit;
an irradiating timing determining unit that determines whether the disparity information is calculated in the disparity calculating unit within a predetermined set time and determines whether to irradiate invisible pattern light or visible pattern light to the outside of the vehicle based on the result of determination; and
a collision determining unit that determines a probability of collision based on the distance information calculated in the distance calculating unit,
wherein even when the disparity information is not calculated in the disparity calculating unit within the predetermined set time, if the plurality of image capturing devices captures an image of the irradiating region after the irradiating timing determining unit outputs a signal to irradiate the pattern light and the disparity calculating unit calculates the disparity information from the captured image data, the distance calculating unit calculates distance information from the disparity information.

2. The in-vehicle camera according to claim 1, further comprising:
an image processing unit that obtains feature amounts of the plurality of images captured by the plurality of image capturing devices; and
a pattern light type determining unit that selects a type of the pattern light based on the feature amounts obtained in the image processing unit,
wherein if the irradiating timing determining unit determines that the disparity information is not calculated within the predetermined set time, the type of the pattern light and the irradiation formation to irradiate the pattern light are output.

3. An in-vehicle camera system, comprising:
the in-vehicle camera according to claim 1; and
a pattern light irradiating device that irradiates pattern light outside a vehicle based on a signal to irradiate the pattern light from the in-vehicle camera.

4. An in-vehicle camera system, comprising:
the in-vehicle camera according to claim 1; and
a control device that, when the collision determining unit of the in-vehicle camera determines that there is a probability that the vehicle collides with an obstacle, generates and outputs a control signal to generate a breaking force to each wheel.

5. An in-vehicle camera system, comprising:
the in-vehicle camera according to claim 1; and
a warning device that, when the collision determining unit of the in-vehicle camera determines that there is a probability that the vehicle collides with an obstacle, issues an alert to notify a danger to a driver.

* * * * *